United States Patent [19]

Sekimoto

[11] Patent Number: 4,769,271
[45] Date of Patent: Sep. 6, 1988

[54] SOUND INSULATION
[76] Inventor: Masami Sekimoto, 9-1-114, Hibarigaoka 3-chome, Nagata-ku, Kobe, Hyogo 653, Japan
[21] Appl. No.: 45,828
[22] Filed: May 1, 1987
[30] Foreign Application Priority Data Nov. 4, 1986 [JP] Japan .................................. 61-263441

[51] Int. Cl.⁴ .......................... B32B 3/26; B32B 3/30
[52] U.S. Cl. ...................................... 428/156; 156/79; 428/159; 428/166; 428/173; 428/309.9
[58] Field of Search ................ 428/173, 306.6, 308.4, 428/317.9, 318.6, 156, 159, 166, 309.9

[56] References Cited

U.S. PATENT DOCUMENTS 4,241,806 12/1980 Metzger ........................... 428/319.1

FOREIGN PATENT DOCUMENTS 2043203 3/1972 Fed. Rep. of Germany ...... 428/160
54-13589 2/1979 Japan .............................. 428/317.9

Primary Examiner—William J. Van Balen
Attorney, Agent, or Firm—Trexler, Bushnell, Giangiorgi & Blackstone, Ltd.

[57] ABSTRACT

A sound insulation comprising an elastomeric foam body (3) made of rubber and having a multiplicity of surface recesses (2), small granular elements (6) filled into the recesses, and a sheet (4) covering openings of the recesses. The granular elements may be made of metal, non-metallic inorganic matter or synthetic resin. The size of the granular elements may be 0.1 to 3 mm in diameter.

2 Claims, 3 Drawing Sheets

SOUND INSULATION

FIELD OF THE INVENTION AND RELATED ART STATEMENT

The present invention relates to a sound insulation material adapted to be interposed between a concrete floor and a flooring material, between a concrete floor and a carpet, or between a flooring material and a carpet. More particularly, the invention relates to a sound insulation material to be used for arresting the propagation of the low-level impact sound such as the sound generated by footwear as well as the high-level impact sound by jumping actions of children, for instance, to the underlying floor where they would otherwise become an interior noise.

Heretofore, a variety of sound absorbing sheets have been devised and installed on the wall, floor and other structural members of buildings for the prevention of noises.

However, these sound absorbing sheets are not as effective as desired in the prevention of certain noises such as the noise between a concrete floor and a flooring material, and with these materials it has been difficult to meet with the requirements of sound insulation grade L-55 of Japanese Industrial Standards for living rooms (the measured values of floor impact sound in the one-octave band: $\leq 78$ dB at the center frequency of 63 Hz, $\leq 68$ dB at 125 Hz, $\leq 61$ dB at 250 Hz, $\leq 55$ dB at 500 Hz, $\leq 52$ dB at 1000 Hz, and $\leq 51$ dB at 2000 Hz).

OBJECT AND SUMMARY OF THE INVENTION

Having been accomplished for the purpose of resolving the above-mentioned problems of the state-of-the art technology, the present invention has as its object to provide a sound insulation material effective against floor impact sounds and particularly the sounds caused by light-weight impact loads.

The sound insulation material of the invention comprises an elastomeric rubber or synthetic resin foam body formed with a multiplicity of surface recesses, small granular elements filled into said recesses, and a sheet covering the openings of said recesses.

The rubber which constitutes the foam body may be natural rubber or synthetic rubber but from the standpoint of the relative ease of formation of said recesses, natural rubber is preferred at the current level of materials technology.

As to the synthetic resin for constituting said foam body, there is not available, at the present, a material that is fully satisfactory in resiliency, ease of formation of recesses and sound insulation effect but if and when a synthetic resin simulating the characteristics of natural rubber becomes available, such a resin may be used as a substitute for rubber.

The foam body can be manufactured by the following simple procedure. A foaming or blowing agent such as sodium carbonate, aqueous ammonia, diazoaminobenzene or the like is kneaded into natural rubber to prepare a sheet with a suitable thickness. This sheet material is placed on a wire-mesh screen with a suitable mesh size and passed through an oven maintained at about 200° C. The rubber undergoing a foaming reaction hangs down through the openings of the wire-mesh screen to form the desired recesses. As an alternative method, the well-known injection molding technology can be utilized as well.

The thickness of the foamed body is preferably 1 to 5 mm and, for still better results, 2 to 3 mm.

The configuration of said recesses may be freely selected and controlled according to the geometry of the wire-mesh screen or metal die used. Cup-shaped or elongated cup-shaped recesses may be generally produced.

The granular elements to be filled into the recesses are preferably made of metal, non-metallic inorganic material or synthetic resin.

As the metal for use as said granular elements, all solid metals inclusive of alloys can be utilized. For example, iron, stainless steel, copper and aluminum may be mentioned.

As examples of the non-metallic inorganic material for use as said granular elements, there may be mentioned sand, glass and ceramics.

As the synthetic resin for use as said granular elements, all commercial synthetic resin materials can be employed. Scraps of synthetic resins can also be utilized.

The granular elements are preferably spherical. The diameter of granular elements depends on the specific gravity of the material. When the material has a large specific gravity, the diameter of granular elements may be comparatively small. If the specific gravity of the material is small, a larger diameter may be selected. The preferred range is 0.1 to 3 mm and the range of 0.5 to 2.5 mm is still more satisfactory. The recesses are preferably filled completely but there may be a free head space or clearance after filling.

As the sheet for covering the openings of the recesses, a woven fabric, knitted fabric, nonwoven fabric, paper or the like can be employed.

As regards the method of filling the recesses with granular elements, the granular elements may be either first introduced and then the openings be covered with said sheet or introduced through small orifices formed in the sheet after attachment thereof.

In use, it is preferable that the sound insulation material is first bonded to the reverse side of the flooring material with the above-mentioned sheet interposed therebetween and, then, brought into contact with the concrete surface.

A carpet may be laid directly on this sheet of the sound insulation material. Moreover, the sound insulation material can be applied to the wall to provide an acoustic wall.

With the sound insulation sheet according to the present invention, particularly the sheet containing small granular elements, the sound insulation grade L-55 of Japanese Industrial Standards, which has been considered difficult to meet with for the insulation between the flooring material and concrete floor, for instance, can be successfully met with.

The mechanism of sound insulation according to the present invention is presumed, to the best of our current knowledge, to be as follows. Since the foam body of the sound insulation material is made of an elastomeric foam, it absorbs sound waves. Moreover, the small granular elements packed into a large number of independent recesses are vibrated by impact sound waves to transform the sound energy to a kinetic energy and further to a thermal energy to thereby shield off the floor impact sound.

BRIEF DESCRIPTION OF THE DRAWINGS

The embodiments of the present invention are described below with reference to the accompanying drawings, in which—

DETAILED DESCRIPTION OF PREFERRED EMBODIMENTS

Figure 1:
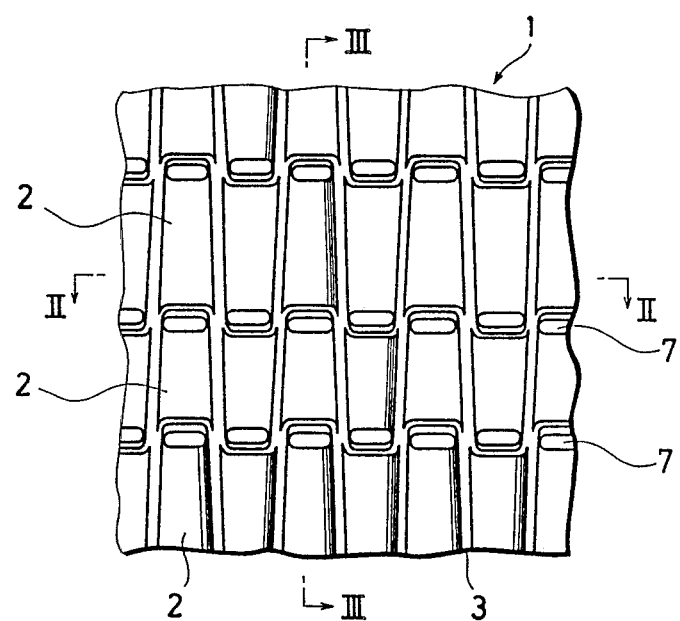
FIG. 1 is a plan view showing the sound insulation material as a first embodiment of the invention.
Figure 2:
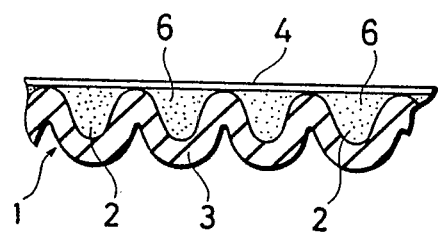
FIG. 2 is a cross-section view taken along the line II—II of FIG. 1.
Figure 3:
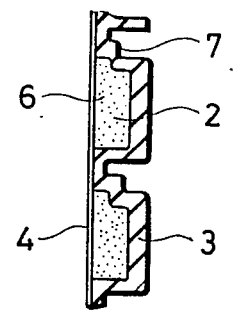
FIG. 3 is a cross-section view taken along the line III—III of FIG. 1.

The sound insulation material shown in FIGS. 1 through 6 is a first embodiment of the present invention.

The sound insulation material designated by 1 comprises a foam body having a multiplicity of recesses 2, small granular elements 6 packed into said recesses, and a sheet 4 covering said recesses 2.

The foam body 3 having said recesses 2 is a foamed natural rubber body provided with a multiplicity of recesses 2. This foam body 3 was manufactured by kneading a foaming or blowing agent such as sodium carbonate, aqueous ammonia, diazoaminobenzene or the like into a batch of natural rubber, molding the batch into a shaped article with a suitable thickness, placing the shaped article on a wire-mesh screen, and passing it through an oven at about 200° C. to cause a foaming reaction. The rubber undergoing the foaming reaction hung down through openings of the wire-mesh screen to form said recesses 2. Because the wire-mesh screen used had elongate openings, the recesses 2 were configured to be elongated cups, each having a step or land 7. The thickness of the foam body 3 was about 3 mm. The size of each recess 2 was about 1 cm wide and about 2 cm long.

The sheet 4 covering the openings was made of a light-weight nonwoven fabric.

The granular elements 6 were substantially spherical iron granules with diameters ranging from 0.4 to 2.0 mm. After filling the recesses 2 with small granular elements 6, the sheet 4 was attached for covering the openings of the recesses 2.

Figure 4:
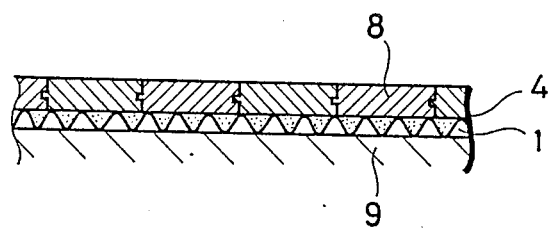
FIG. 4 is a cross-section view showing the sound insulation material as the first embodiment of the invention in use.

In use, as shown in FIG. 4, the above sound insulation material 1 was first bonded to the reverse side of a flooring material 8 with the sheet 4 interposed therebetween and, then, the heat insulation material 1 was contacted with the surface of the concrete floor 9. The sound insulation effect was as remarkable as to meet with Grade L-55 of Japanese Industrial Standards.

Figure 5:
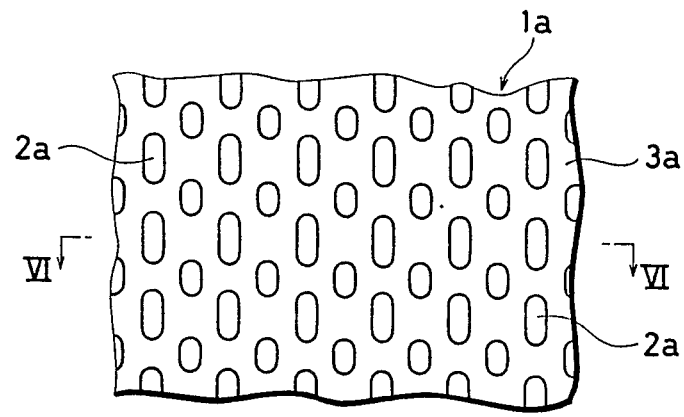
FIG. 5 is a plan view showing a second embodiment of the present invention.
Figure 6:
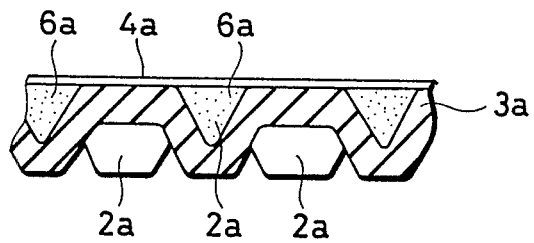
FIG. 6 is a cross-section view taken along the line VI—VI of FIG. 4.

The sound insulation material 1 shown in FIGS. 5 and 6 is a second embodiment of the present invention.

This embodiment is identical with the first embodiment in cardinal part. The differences are in regard of the facts that the foam body 3a was made of butyl rubber, a synthetic rubber, that the recesses 2a were formed by injection molding with a metal die, that small granular elements 6a were made of synthetic resin and had diameters of about 2 mm, and that the sectional configuration of recesses 2a was approximately triangular.

The triangular configuration of recesses 2a was adopted to facilitate filling with the small granular elements 6a and reduce the amount of the elements and thereby reduce the total weight of the product.

This sound insulation board was used in the same manner as the first embodiment. The sound insulation effect was so remarkable that Grade L-55 of Japanese Industrial Standards was successfully met with.

It should be understood that the foregoing relates to only preferred embodiments of the invention, and that it is intended to cover all changes and modifications of the examples of the invention herein chosen for the purpose of the disclosure, which do not constitute departures from the spirit and scope of the invention as defined in the following claims.

I claim:

1. A sound insulation material comprising: a flat member having a thickness of substantially on the order of 1 mm to 5 mm and a plurality of recesses formed on at least one surface thereof, said flat member being formed of a quantity of natural or synthetic rubber into which has been kneaded a foaming or blowing agent, and thereafter, the natural or synthetic rubber containing the foaming or blowing agent has been molded into said flat member, and wherein said recesses are formed by thereafter placing said flat member on a wire-mesh screen and passing the flat member mounted on the wire-mesh screen through an oven at about 200 degrees C. to cause a faoming reaction so that surface portions of said flat member hang down through openings of said wire-mesh screen to form said plurality of recesses, said recesses being of cross-sectional dimensions at least an order of magnitude greater than said thickness of said flat member; a plurality of small spherical elements substantially filling at least selected ones of said recesses, said small spherical elements being made of metal or non-metal inorganic matter and measuring substantially on the order of 0.1 mm of 3 mm in diameter; and a sheet covering at least said recesses having the spherical elements therein.

2. A method of producing a sound insulation comprising: kneading a foaming or blowing agent into a quantity of natural or synthetic rubber, molding said quantity of natural or synthetic rubber containing the foaming or blowing agent into a flat member of substantially on the order of 1 mm to 5 mm thickness; placing said flat member on a wire-mesh screen; passing said first member mounted on the wire-mesh screen through an oven at about 200 degrees C. to cause a foaming reaction so that portions of said flat member hang down through openings of said wire-mesh screen to form a plurality of recesses of cross-sectional dimension at least an order of magnitude greater than said thickness of said flat member; introducing into said recesses small spherical elements measuring about 0.1 mm to 3 mm in diameter; and covering said recesses having spherical elements with a sheet.

* * * * *